USOO9788689B2

(12) United States Patent
Bizal et al.

(10) Patent No.: US 9,788,689 B2
(45) Date of Patent: Oct. 17, 2017

(54) WIDE FLANGED COOKING DEVICE WITH COLLAPSIBLE STAND

(71) Applicant: Fryin' Saucer, Inc., Fridley, MN (US)

(72) Inventors: Michael John Bizal, Blaine, MN (US); John Joseph Egart, Andover, MN (US)

(73) Assignee: Fryin' Saucer, Inc., Fridley, MN (US)

( * ) Notice: Subject to any disclaimer, the term of this patent is extended or adjusted under 35 U.S.C. 154(b) by 0 days.

(21) Appl. No.: 13/998,664

(22) Filed: Nov. 21, 2013

(65) Prior Publication Data
US 2015/0136111 A1   May 21, 2015
US 2017/0251877 A9   Sep. 7, 2017

Related U.S. Application Data

(63) Continuation-in-part of application No. 12/653,147, filed on Dec. 9, 2009.

(60) Provisional application No. 61/203,072, filed on Dec. 18, 2008.

(51) Int. Cl.
*A47J 37/00* (2006.01)
*F24C 15/08* (2006.01)
*F24B 3/00* (2006.01)
*A47J 37/07* (2006.01)
*A47J 37/10* (2006.01)
*A47J 33/00* (2006.01)

(52) U.S. Cl.
CPC ........... *A47J 37/0763* (2013.01); *A47J 33/00* (2013.01); *A47J 37/108* (2013.01)

(58) Field of Classification Search
CPC ...... A47J 37/0763; A47J 37/108; A47J 33/00; A47J 37/10
USPC ................................. 126/1 R, 25 R, 29, 9 R
See application file for complete search history.

(56) References Cited

U.S. PATENT DOCUMENTS

| 836,983 A | 11/1906 | Millwee |
| 1,169,560 A | 1/1916 | Murray |
| 1,431,696 A | 10/1922 | Shankland |
| 1,622,587 A | 8/1926 | Housel |
| 1,732,910 A | 8/1928 | Possons |
| 1,733,450 A | 11/1928 | Detwiler |
| 1,936,551 A | 7/1932 | Russell |
| 2,012,520 A | 1/1935 | Rogers |
| 2,262,302 A | 5/1940 | Sinclair |
| 2,328,978 A | 6/1941 | Hennessy |
| 2,787,995 A | 6/1950 | Alter |
| 3,038,402 A | 3/1959 | Singer |
| 3,025,849 A | 4/1960 | Zimmerman |
| 3,079,855 A | 3/1963 | Valis |
| 3,427,957 A | 2/1969 | O'Reilly |
| 3,469,524 A | 9/1969 | Trozollo |
| 3,759,164 A | 9/1973 | Robinson |
| D229,824 S | 1/1974 | Erickson |
| 3,785,274 A | 1/1974 | Yamamoto |
| 3,847,068 A | 11/1974 | Beer |
| 3,877,458 A | 4/1975 | Allander |

(Continued)

*Primary Examiner* — Jason Lau
(74) *Attorney, Agent, or Firm* — Merchant & Gould P.C.

(57) ABSTRACT

A cooking device having a liquid containing well in a center surrounded by a connected flange positioned or formed at an angle to the well for draining liquid into the well, and has a controllable flame directed to said well. A collapsible stand has a frame that holds the cooking device and the source of the flame, and has articulated legs selectively collapsible alongside the frame.

10 Claims, 5 Drawing Sheets

(56) References Cited

U.S. PATENT DOCUMENTS

| | | |
|---|---|---|
| 3,960,134 A | 6/1976 | Scott |
| D245,663 S | 9/1977 | Gordon |
| 4,134,385 A | 1/1979 | Barter |
| 4,192,284 A | 3/1980 | Vache |
| D264,928 S | 6/1982 | DiFede |
| 4,385,619 A | 5/1983 | Casinelli |
| 4,530,345 A | 7/1985 | Christiansen |
| 4,574,777 A | 3/1986 | Bohl et al. |
| D288,891 S | 3/1987 | Saito |
| 4,666,727 A | 5/1987 | Wang |
| 4,704,955 A * | 11/1987 | Archibald ........... A47J 37/0713 99/339 |
| 4,726,350 A | 2/1988 | Steinhauser |
| D296,861 S | 7/1988 | Fielding |
| 5,065,735 A | 11/1991 | Bourgeois |
| 5,117,808 A | 6/1992 | Peters |
| D364,534 S | 11/1995 | Brown et al. |
| 5,511,466 A | 4/1996 | Dzibinski |
| D376,315 S | 12/1996 | Gumowitz |
| 6,102,027 A | 8/2000 | Tilby |
| 6,223,738 B1 | 5/2001 | Wu |
| D458,804 S | 6/2002 | Reames |
| 6,446,544 B1 | 9/2002 | Creighton |
| D469,656 S | 2/2003 | Vollmer |
| 6,526,875 B1 | 3/2003 | Dzbinski |
| 6,742,514 B1 * | 6/2004 | Eastman, II .......... F23D 14/065 126/38 |
| 6,918,563 B2 | 7/2005 | Tseng |
| 6,978,777 B2 | 12/2005 | Pestrue |
| 7,086,552 B2 | 8/2006 | Zepter |
| D545,124 S | 6/2007 | Hawkins |
| D648,979 S | 11/2011 | Schroeder et al. |
| 8,733,235 B1 * | 5/2014 | Chipman ...................... 99/339 |
| 8,869,681 B2 | 10/2014 | Schroeder et al. |
| 2002/0083846 A1 | 7/2002 | Creighton |
| 2005/0109330 A1 | 5/2005 | Pestrue et al. |
| 2006/0011072 A1 | 1/2006 | Giomalli et al. |
| 2010/0175563 A1 | 7/2010 | Bizal et al. |
| 2012/0006208 A1 | 1/2012 | Schroeder et al. |
| 2012/0237647 A1 * | 9/2012 | Dobert et al. ................ 426/243 |

* cited by examiner

WIDE FLANGED COOKING DEVICE WITH COLLAPSIBLE STAND

CONTINUATION-IN-PART APPLICATION AND CLAIM OF PRIORITY UNDER 35 U.S.C., §120**

This application is a continuation-in-part of application Ser. No. 12/653,147, filed Dec. 9, 2009, now U.S. Pat. No. 9,737,170, issued on Aug. 22, 2017, which claims priority to application Ser. No. 61/203,072, filed on Dec. 8, 2008. Applicants herein claim all priority rights under Title 35 U.S.C., §120 et seq., for all matter disclosed in said co-pending application.

BACKGROUND OF THE INVENTION

Field of the Invention

The present invention relates to the art of cooking device and more particularly to the art of portable cooking devices storable in tight spaces.

Description of the Prior Art

In the past, it has been known to provide portable frying assemblies, as may be seen, for representative example, in Kimbrough, U.S. Pat. No. 3,722,498. Some portable cooking arrangements have provided optional shelf attachments, such as, for example, Coleman, et al. U.S. Pat. No. 6,951, 213. Typically, such shelf arrangements are provided primarily for positioning cooking tools such as spatulas and tongs. Id. Such shelf arrangements are typically flat or level shelving, as may be appreciated given the purpose for them. Some frying arrangements are configured to be inserted in a level table which provides extended storage area adjacent to the frying pan or well. See, e.g., Segroves, U.S. Pat. No. 4,759,276.

All such arrangements show and describe significant improvements in the art of cooking by frying in portable devices. However, it has been sought to provide for a frying configuration which also provides for storage of the cooked, fried food immediately following the frying, whereby the frying oils or other liquids are drained from the fried foods while the fried foods are maintained warm, even hot during such a draining process.

Moreover, it is desired to provide a portable cooking by frying device which can maintain the cooked food at least warm, if not hot for substantial times, even after the foods have been drained. It is further desired that both of these desired objectives be provided in a portable structure that can be folded into a relatively small, tight spaced configuration that can be carried simply with one hand.

SUMMARY

In brief, in accordance with one aspect of the present invention, a relatively large plate structure has a well or reservoir at its center for receiving cooking oil or liquid and a substantial surface or flange integral with the reservoir on which surface cooked food may be drained of excess oil or liquid and be kept warm for substantial periods of time. In another aspect of the present invention, the plate structure has a second flange integral with the reservoir on which the cooked food can be kept warm, even hot for a substantial time even after the food has been drained of the cooking oils or liquids. In yet another aspect of the invention, a collapsible stand comprising legs that can be retracted into a tight space provides a stable support for the plate which can be detached from the stand, and provides support and position for controllable heating means.

These and other novel aspects of the present invention, together with other aspects thereof, can be better understood by the following detailed description of the preferred embodiments, which are designed to be read in conjunction and together with the accompanying drawings.

DESCRIPTION OF THE PREFERRED EMBODIMENTS

Figure 1:
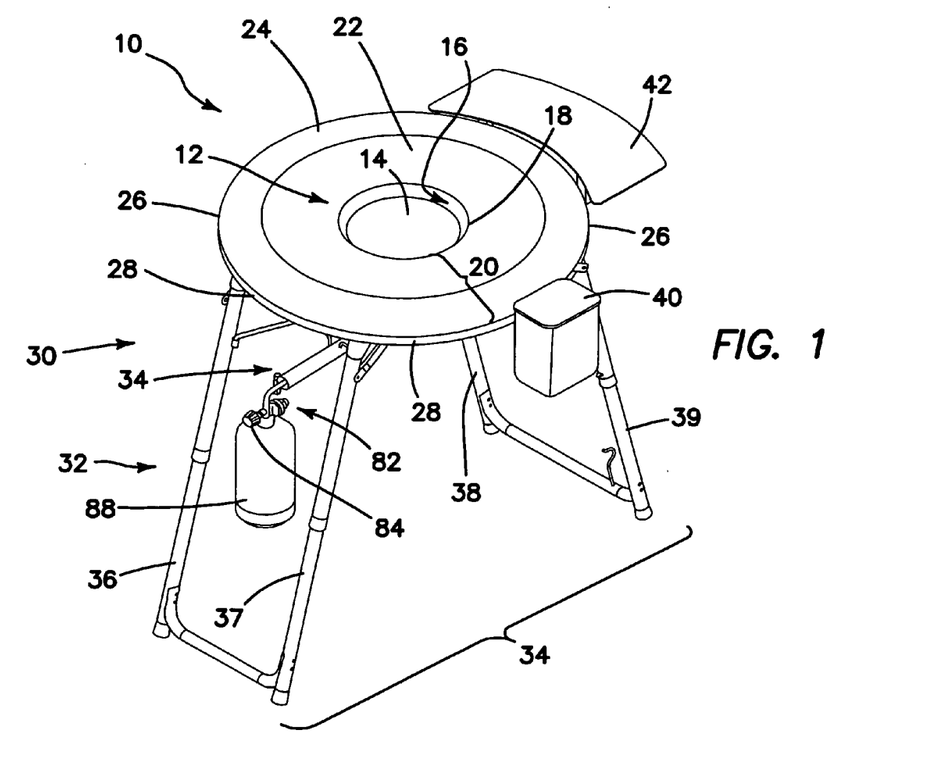
FIG. 1 is a top perspective view of the cooking device in accordance with the preferred embodiment of the present invention showing the plate structure, a stand and heating means assembled in an upright position.
Figure 2:
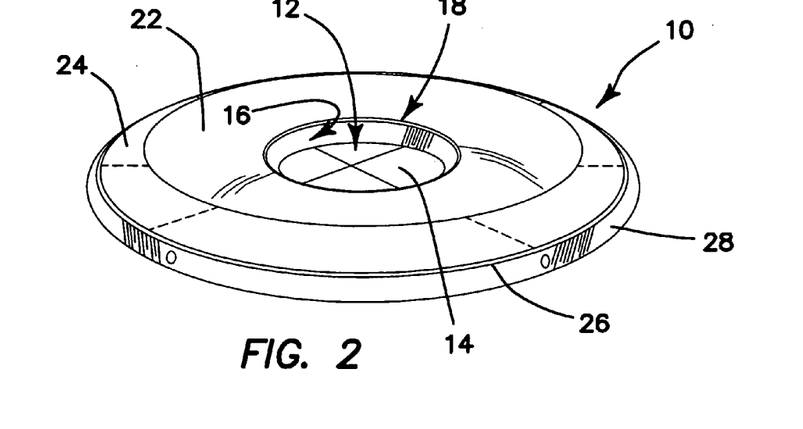
FIG. 2 is an angle or perspective view of the cooking device plate structure of the preferred embodiment of FIG. 1 showing the plate structure in greater detail.

A cooking device plate structure 10 is shown, reference being had initially to FIGS. 1 and 2 of the accompanying drawings where reference numerals refer to like reference numerals used herein. The plate structure 10 comprises a well or reservoir 12 for containing liquid. The reservoir 12 has a circular bottom 14 with an upright cylindrical side wall 16 defining a depth between the bottom 14 and the top edge 18 of the reservoir 12. The plate structure 10 extends from the reservoir top edge 18 radially outward to an outer edge defined by the outer circumferential edge 28 in a plate flange 20. Flange 20 has two concentric annular portions 22, 24. A first beveled portion 22 extends outwardly from, and sloped downwardly toward the top edge 18 of the reservoir 12. A second, substantially horizontal portion 24 extends outwardly from the beveled portion 22 to the outer, circumferential edge 26. An outer, vertical flange 28 extends downwardly from the outer, circumferential edge 26 to form a curtain for purposes that will be described in greater detail below. In the preferred embodiment, the structure 10 comprising the reservoir 12, the beveled flange portion 22, the substantially level or horizontal flange portion 24 and the outer vertical flange 28 are formed of a single, integral metal plate capable of sustaining and conducting heat.

The cooking device assembly 30, is best seen in FIG. 1 of the drawings, where the support stand 32 and, partially, the burner assembly 34 are shown. The support stand 32 is comprised of a first pair of legs 36, 37 and a second pair of legs 38, 39. A bucket-like utility holder 40 and an accessory shelf 42 are attached to round out the cooking device assembly 30.

Figure 3:
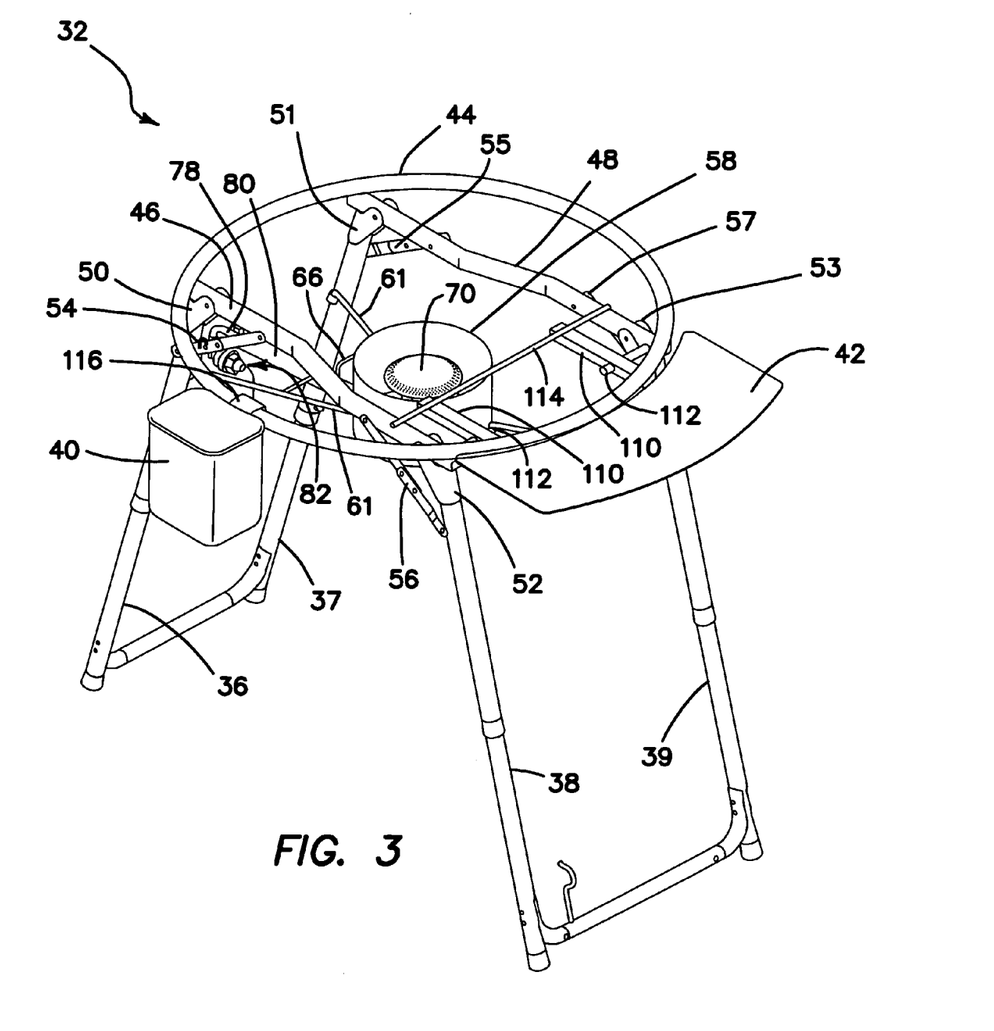
FIG. 3 is top perspective view of details of the stand and heating means of the preferred embodiment shown in FIG. 1 assembled in an upright position with the cooking device plate structure removed for clarity.

In FIG. 3, the support stand 32 and the burner assembly 34 are shown with the cooking device structure 10 removed for clarity. The stand 32 has a circular frame ring 44 with a first brace 46 and a second brace 48 positioned parallel to each other and connected to the frame ring 44, each across an arc of the frame ring 44. The leg 36 of the first pair of legs 36, 37 is connected articulately by hinge 50 to the first brace 46 and locked into position by stabilizing support lock or arm 54. The leg 37 of the first pair of legs 36, 37 is connected articulately by hinge 51 to the second brace 48 and locked into position by stabilizing support lock or arm 55. The leg 38 of the second pair of legs 38, 39 is connected articulately by hinge 52 to the brace 46 and locked into position by stabilizing support lock or arm 56. The leg 39 of the second pair of legs 38, 39 is connected articulately by hinge 53 to the brace 48 and locked into position by stabilizing support lock or arm 57. Each of the legs 36, 37, 38, 39 is a telescoping leg, and is shown in FIGS. 1 and 3 extended into its full, telescopic extension. When it is desired to fold the support means stand 32 into a tight, small space, as will be described in greater detail below, the lower portion of the legs 36, 37, 38, 39 will be telescoped into the upper portion to result in substantially half the length as when the legs are extended into the upright position of FIGS. 1 and 3.

A wind ring or chimney 58 is placed upon the metal support arms 61 around a heating plate 70, the flame end of the pneumatic tube 78 and the nozzle 90 beneath the heating plate 70, for the purpose of shielding the flame 92 from wind and other disturbances. It is preferred that the upper end of the wind ring or chimney 58 not be in physical contact with the vertical side 16 of the reservoir well 12, but slightly spaced below the reservoir well 12 so as to allow heat from the flame 92 to flow out from the wind ring or chimney 58 and around the vertical side 16 which will result in directing heat to the flanges 22, 24.

Figure 4:
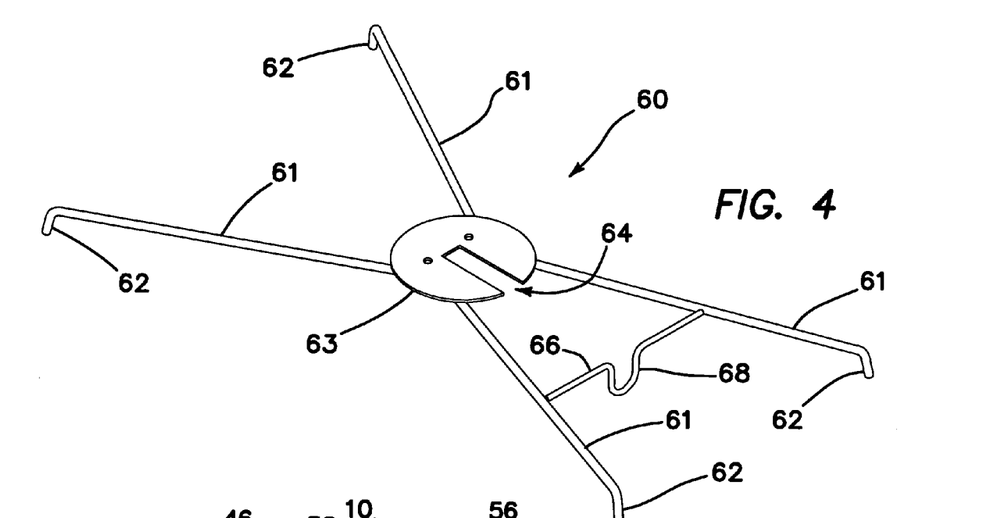
FIG. 4 is a top perspective view of the details of the burner support arms of FIG. 1 of the preferred embodiment of the present invention.

In FIG. 4, the metal burner and wind shield support 60 is shown having metal support arms 61 extending from a central support plate 63. Each support arm 61 has a bent end 62 for inserting into its corresponding hole in one of the legs 36, 37, 38, 39. The support plate 63 has a slot 64 formed to receive parts of the burner assembly, as will be explained in greater detain below. Between two of the arms 61 extends an heating means brace 66 having a "U" shaped indent 68 to receive a pneumatic tube heat shield 80, again as will be explained in greater detail below. When each of the bent ends 62 is inserted into its corresponding leg 36, 37, 38, 39, the burner and wind shield support 60 is properly positioned to support the burner assembly 34 as well as the chimney or wind shield 58.

Figures 5, 6:
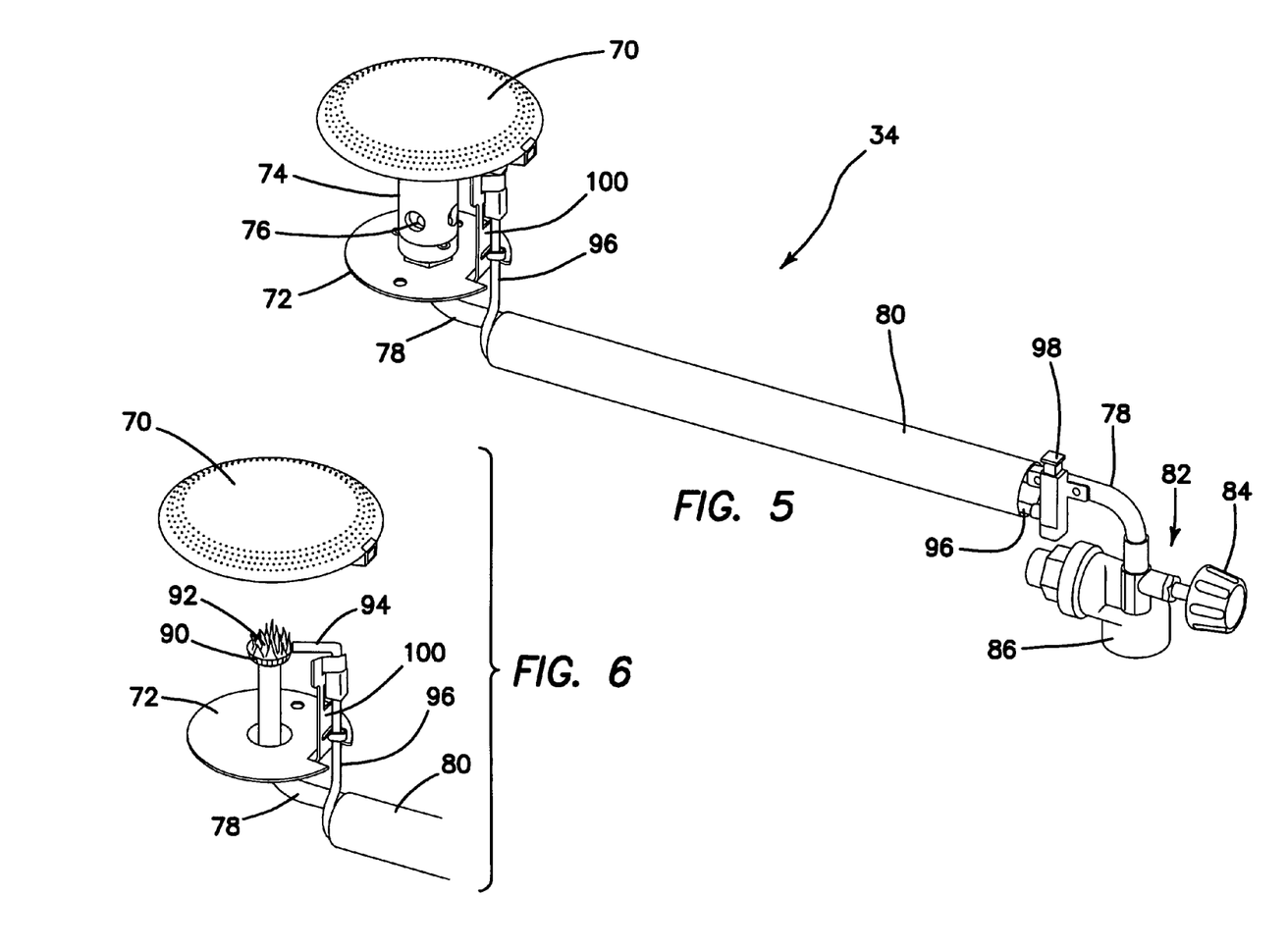
FIG. 5 is a side perspective view of details of the burner and regulator control of FIG. 1 of the preferred embodiment of the present invention.
FIG. 6 is a side perspective view of the burner of FIG. 5, having parts removed and parts exploded for clarity of description.

In FIG. 5, the burner assembly 34 is shown in greater detail. A heating plate 70 is spaced a set distance above heating means support plate 72 by support cylinder 74. Air intake holes 76 are formed in the cylinder 74 to supply oxygen to a flame 92 within. A pneumatic tube 78 runs from inside the cylinder 74 to a pneumatic connector 86 through a gas control valve or regulator 82. The tube 78 is protected by a heat shield 80.

Referring now to both FIGS. 4 and 5, the heating means support plate 72 is inserted into the slot 64 of the burner support assembly 60. The heat shield 80 is nestled into the "U" shaped indent 68 of heating means brace 66 to provide support for the extended tube 78 and heat shield 80. At this point, the burner assembly 34 is mounted between the legs 36, 37, 38, 39 by means of the burner support arms 61 of the burner and wind shield support 60. A gas supply 88 can be attached to the connector 86, as seen best in FIG. 1 of the drawings.

As better seen in FIG. 6 of the drawings, which is a view of the flame end of the burner assembly 34, and in which the support cylinder 74 is removed and the heating plate 70 is exploded upward for clarity to show the end of the pneumatic tube 78, the end of the pneumatic tube 78 is pneumatically connected to flame nozzle 90. Within the support cylinder 74, the flame nozzle 90 is set pointed to the underside of heating plate 70 so that when a flame 92 is ignited, the flame 92 will go toward the underside of, and heat plate 70. By means of the gas control valve or regulator 84, the supply of gas to the nozzle 90 within the cylinder 74 can be selectively controlled and regulated.

Referring to both FIGS. 5 and 6, an electrical spark ignitor 94 comprises the end of an electrical conductor 96 and a ground. The other end of the electrical conductor 96 terminates in a push button operable switch 98. When depressed, switch 98 ignites a spark at ignitor 94. If gas is being supplied from gas supply 88 by selectively operating the control knob 84 of the control valve or regulator 82, the spark should ignite flame 92, and heat will be supplied to the heating plate 70.

The control valve or regulator 82 to include the manually operable control knob 84, and the gas or other energy supply 88, and the spark ignitor switch 98 are spaced a substantial distance from the flame nozzle 90, the spark ignitor 94 and the heating plate 70. By this structure, heat from the flame 92, or from the heating plate 70, or from liquid in the liquid containing means 12 is kept at a safe distance from the control valve or regulator 82 and the control knob 84 so that the heat will not interfere with safe operation of the cooking device structure. Moreover, the chance for extreme heat destructively contacting the control valve or regulator 82 or the gas supply 88 is substantially reduced if not completely eliminated.

In operation, the cooking device 30 is assembled initially by extending the each of the pair of legs 36, 37 and 38, 39 into their extended, upright position by pivoting the legs about their corresponding hinges 50, 51 and 52, 53. The legs are locked into their extended, upright position by locking the corresponding lock arms 54, 55, 56, 57. The burner and wind shield support 60 is then attached to the legs by inserting the bent ends 62 into corresponding holes in the legs 36, 37, 38, 39, each bent end 62 in its corresponding leg. The burner assembly 34 is then put into position by inserting the heating means support plate 72 into the slot 64 of the burner and wind shield support 60, with the heat shield 80 nestled into the "U" indent 68 on the brace 66. A gas supply 88 is then secured to the valve or gas regulator assembly 82. The cooking device structure 10 is then positioned onto the stand frame 44.

The gas regulator control knob 84 is then selectively turned to open the valve proportionately and establish the desired gas flow though the pneumatic tube 78, supplying gas to the flame nozzle 90 within the cylinder 74. The gas is ignited by pushing the switch 98 to cause a spark at ignitor 94. Alternatively, the gas can be ignited by any convenient and safe means, such as by safety matches or the like. The resulting flame 92 will heat the heating plate 70.

Frying oil is then inserted into the reservoir 12. Food to be fried is placed within the reservoir 12. When cooked, the food is removed from the reservoir 12 and placed on the beveled flange 22, allowing excess oil from the frying process to drain back into the reservoir 12. The heat transmitted to the underside of the reservoir 12 from the heating plate 70, is transmitted by the thermally conducting metal of the cooking device structure 10 outwardly to the beveled flange 22 and to the horizontal flange 24. Heat is trapped within the space immediately below the cooking device structure 10 by its outer vertical flange 26 surrounding the cooking device structure 10, in effect creating a downward lip trapping the heat underneath the flanges 22, 24. Food cooked and laid on the flange 22 will be kept warm, even hot while excess oil is drained from it. After satisfactory amounts of the excess oil is so drained, the food may then be moved to the horizontal flange 24. The heat trapped underneath the cooking device structure 10 by the downward flange 26 will continue to keep the food warm while further waiting.

Figure 7:
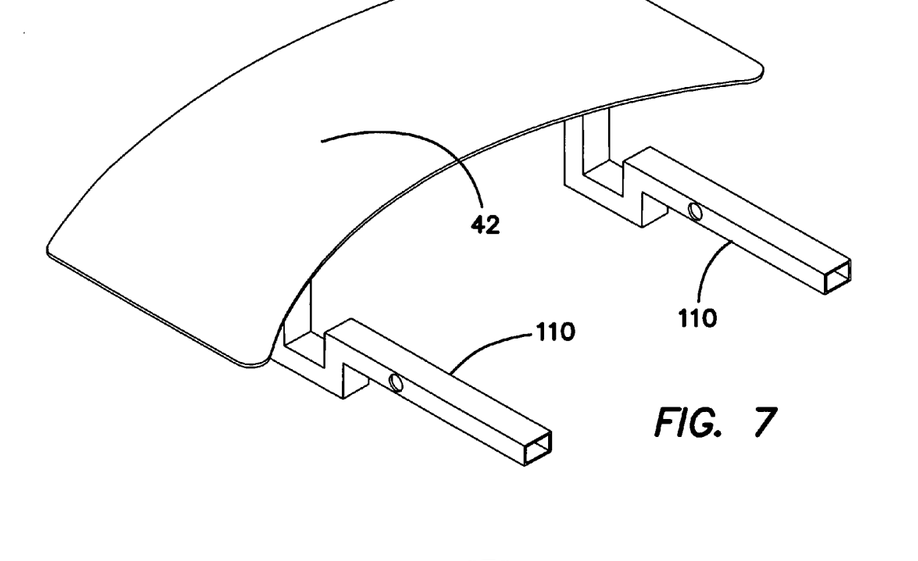
FIG. 7 is a perspective view of shelf in an alternative embodiment of the present invention.

In FIG. 7 of the accompanying drawings, an alternative embodiment embodying a shelf 42 is illustrated. The shelf 42 is intended primarily for holding accessories, but may be used for any purpose, such as, e.g., holding foods cooked or to be cooked. The shelf 42 had two support arms 110. As better shown in FIG. 3, the support arms 110 are pivotally secured to the braces 46, 48 by pins 112, and the far ends of the arms 110 are positioned under a shelf rod 114, also secured to and between the braces 46, 48. The pins 112 in effect act as a fulcrum about which the shelf 42 settles into position by forcing against the shelf rod 114. The arms 110 have an indent portion along their lengths to receive the outer vertical flange 28 of the cooking device structure 10 when the cooking device structure 10 is positioned over the stand frame 44. Thus, when the cooking device structure 10 is placed on the stand frame 44, the cooking device structure 10 completely settles on and contacts with the frame 44 at every point along the entire circumference of the frame 44, as shown in FIG. 1 of the drawings.

Figure 8:
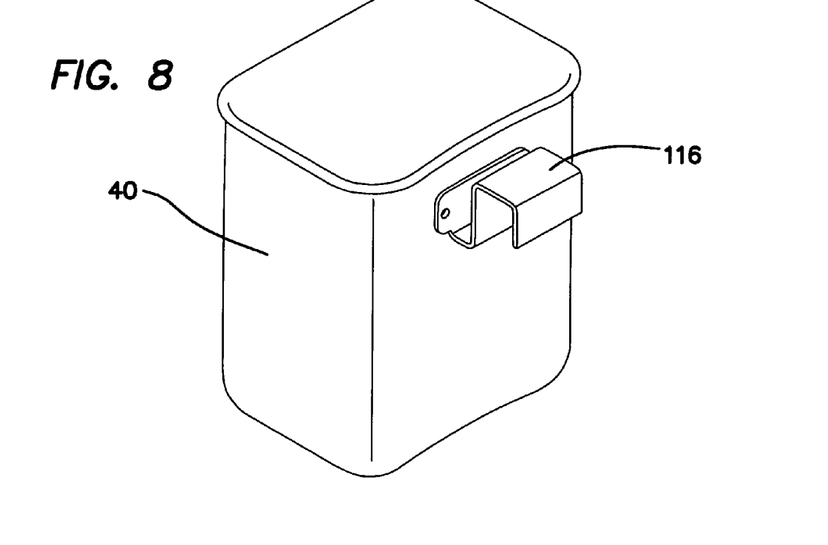
FIG. 8 is perspective view of a utility holder in an alternative embodiment of the present invention; and, FIG. 9 is a side perspective view of the preferred embodiment of the present invention having the cooking device plate structure removed for clarity, and showing the stand partially collapsed for storage and transporting.

In FIG. 8 of the drawings, yet another alternative embodiment comprising a utility holder 40 is shown. The holder 40 is intended for holding cooking accessories such as, e.g., cooking utensils but may be used for any purpose for which a bucket like container may be desired. The holder 40 is equipped with a clip or hook 116 for positioning over the stand frame 44, as best seen in FIG. 3 of the drawings. Again, the hook 116 has a shape with a indent to receive the outer vertical flange 26 of the cooking device structure 10 when the cooking device structure 10 is position onto the stand frame 44, as shown in FIG. 1.

When it is desired to store the cooking device altogether, the gas control knob 84 is used to close the valve or regulator 82 to stop the gas supplied to the heating plate 70, and the cooking device assembly 30 is cooled. The cooking device structure 10 is then removed from the stand frame 44, and the used oil safely removed from the reservoir 12. The gas supply 88 is detached from the pneumatic connector 86. The wind shield or chimney 58 is lifted from its position on the metal support arms 61. The burner assembly 34 is then removed by lifting the heat shield 80 from its nestled position in the "U" indent 68, and the heating means support plate 72 is slid out of the slot 64. The burner and wind shield support 60 is detached from the stand 44 by removing the bent ends 62 from their corresponding legs 36, 37, 38, 39.

Figure 9:
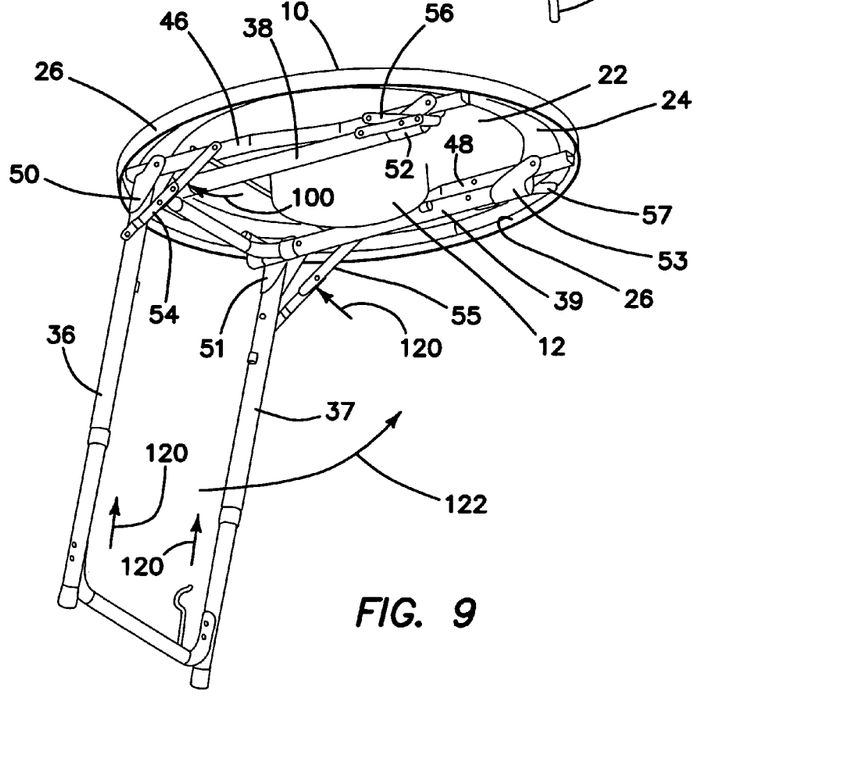

Next, the lock arms 54, 55, 56, 57 are unlocked by articulating the joint in the lock arms in the direction of the arrows 118 as shown in FIG. 9 of the accompanying drawings. At substantially the same time, the legs 36, 37, 38, 39 are telescoped in the direction of arrows 120 into a shorter length, as depicted for legs 38, 39 and partially for legs 36, 37 in the view of FIG. 9. The pairs of legs 36, 37 and 38, 39 are articulately pivoted inwardly about their corresponding hinges 50, 51, 52, 53 so to collapse the pairs of legs against the braces 46, 48 and the stand frame 44.

In FIG. 9, the cooking device structure 10 is depicted positioned on the stand ring or frame 44. The entire support stand 32 fits within the outer cooking flange 26. The reservoir 12 protrudes downward between the braces 46, 48. In the view of FIG. 9, the undersides of the beveled flange 22 and the horizontal flange 24 may be seen. The burner and wind shield support 60 and the burner assembly 34 can then be placed within the tight compact space left over after the pairs of legs 36, 37 and 38, 39 are collapsed and positioned within the space defined by the outer vertical flange 26. If desired, a cover, not shown, can be made to fit over such a compacted assembly, for ease in transporting the cooking device.

Although the preferred and alternative embodiments of the present invention have been described by a primarily circular cooking device structure 10 and cooking device assembly 30, other designs may be used to work the same purpose and benefit.

The foregoing detailed description of my invention and of preferred and of alternative embodiments to products, compositions and processes, is illustrative of specific embodiments only. It is to be understood, however, that additional embodiments may be perceived by those skilled in the art. The embodiments described herein, together with those additional embodiments, are considered to be within the scope of the present invention.

We claim:

1. A flanged cooking device comprising:
   a. a cooking structure having:
      a center constructed of heat conducting material comprising a liquid container for containing high temperature liquid positioned substantially at said center, said liquid container having a closed side integral with a bottom and being open at a top;
      a first flange comprising an annular flange and having an inner edge and an outer edge, said first flange inner edge being thermally connected at the top of said liquid container; said first flange for holding cooked food and for allowing liquid to drain into said liquid container;
      a second flange for holding cooked food and comprising an inner edge and an outer edge, said second flange inner edge being thermally connected to said first flange outer edge; and
      a third flange for confining heat substantially within and underneath said first flange and said second flange;
   b. a heater for providing variable pre-selected heat to said liquid container said heater comprising a regulator for pre-determining an amount of heat to be supplied to said liquid container; and
   c. a collapsible stand for selectively holding said cooking structure a predetermined distance from a floor and for holding said heater in thermal conducting proximity to said liquid container, said collapsible stand having a stand frame for receiving said cooking structure and further having articulated legs connected to said stand frame, said legs in a first articulated position being extended from said frame and in a second articulated position being collapsed alongside said frame.

2. The flanged cooking device of claim 1 wherein said third flange comprises substantially a vertical cylinder having an upper edge hermetically connected to said outer edge of said second flange.

3. The flanged cooking device of claim 1 wherein said first flange is positioned with a beveled incline from the outer edge of said first flange to the inner edge of said first flange, whereby liquid is induced by gravity to flow into said liquid container.

4. The flanged cooking device of claim 3 wherein said second flange is oriented substantially horizontally relative to said first flange.

5. The flanged cooking device of claim 4 wherein said third flange holds heat beneath said first flange and said second flange, whereby heating said first flange and said second flange.

6. The flanged cooking device of claim 2 wherein said second flange is oriented substantially horizontally relative to said first flange.

7. The flanged cooking device of claim 1 wherein said heater comprises a nozzle positioned in proximity to said liquid container, a pneumatic tube pneumatically connecting said nozzle to said regulator, and a coupler for connecting said regulator with a source of gas.

8. The flanged cooking device of claim 7 wherein said regulator comprises a manually operable variable control valve for pre-determining the amount of gas flow into and through said pneumatic tube.

9. The flanged cooking device of claim 8 wherein said control valve is spaced a distance from said nozzle sufficient to prevent heat from a flame from said nozzle from destructively contacting said regulator.

10. The flanged cooking device of claim 7 wherein said nozzle is pointed upward, and said heater further comprises a heating plate positioned between said nozzle and said liquid container for spreading heat from a flame from said nozzle more evenly to said liquid container.

* * * * *

UNITED STATES PATENT AND TRADEMARK OFFICE
CERTIFICATE OF CORRECTION

Page 1 of 1

PATENT NO. : 9,788,689 B2
APPLICATION NO. : 13/998664
DATED : October 17, 2017
INVENTOR(S) : Bizal et al.

It is certified that error appears in the above-identified patent and that said Letters Patent is hereby corrected as shown below:

In the Specification

Column 3, Line 47: "greater detain below." should read --greater detail below.--

Column 4, Line 41: "by extending the each of" should read --by extending each of--

Column 5, Line 43: "shape with a indent" should read --shape with an indent--

Signed and Sealed this
Fourth Day of June, 2019

Andrei Iancu
*Director of the United States Patent and Trademark Office*